United States Patent
Robert Jose et al.

(10) Patent No.: US 11,507,572 B2
(45) Date of Patent: Nov. 22, 2022

(54) SYSTEMS AND METHODS FOR INTERPRETING NATURAL LANGUAGE SEARCH QUERIES

(71) Applicant: Rovi Guides, Inc., San Jose, CA (US)

(72) Inventors: Jeffry Copps Robert Jose, Tamil Nadu (IN); Ajay Kumar Mishra, Karnataka (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 17/038,643

(22) Filed: Sep. 30, 2020

(65) Prior Publication Data

US 2022/0100741 A1 Mar. 31, 2022

(51) Int. Cl.
  *G06F 16/242* (2019.01)
  *G06F 16/248* (2019.01)
  *G10L 15/26* (2006.01)
  *G06F 16/2457* (2019.01)
  *G06F 16/28* (2019.01)

(52) U.S. Cl.
  CPC ......... *G06F 16/243* (2019.01); *G06F 16/248* (2019.01); *G06F 16/24573* (2019.01); *G06F 16/287* (2019.01); *G10L 15/26* (2013.01)

(58) Field of Classification Search
  None
  See application file for complete search history.

(56) References Cited

U.S. PATENT DOCUMENTS

| | | | |
|---|---|---|---|
| 6,523,026 B1 | 2/2003 | Gillis | |
| 6,615,172 B1 | 9/2003 | Bennett et al. | |
| 6,901,399 B1* | 5/2005 | Corston | G06F 16/3344 |
| 7,536,408 B2 | 5/2009 | Patterson | |
| 10,515,125 B1* | 12/2019 | Lavergne | G06F 16/316 |
| 10,769,371 B1 | 9/2020 | Barrientos et al. | |
| 10,860,631 B1 | 12/2020 | Huang et al. | |
| 2003/0078766 A1 | 4/2003 | Appelt et al. | |
| 2004/0024739 A1 | 2/2004 | Copperman et al. | |
| 2008/0208566 A1 | 8/2008 | Alonichau | |
| 2009/0070300 A1 | 3/2009 | Bartels et al. | |
| 2009/0150152 A1 | 6/2009 | Wasserblat et al. | |
| 2009/0171945 A1 | 7/2009 | Li et al. | |
| 2009/0287678 A1* | 11/2009 | Brown | G06F 16/334 |
| 2010/0185661 A1 | 7/2010 | Malden et al. | |

(Continued)

OTHER PUBLICATIONS

International Search Report and Written Opinion, dated Feb. 18, 2021, issued in International Application No. PCT/US2020/065307 (9 pages).

*Primary Examiner* — Wilson Lee
(74) *Attorney, Agent, or Firm* — Haley Guiliano LLP

(57) ABSTRACT

Systems and methods are described herein for interpreting natural language search queries that account for contextual relevance of words of the search query that would ordinarily not be processed, including, for example, processing each word of the query. Each term or phrase is associated with a respective part of speech, and a frequency of occurrence of a combination of adjacent terms or phrases public domain is determined. A relevance of each term is then determined based on its respective type of term and frequency of occurrence in the public domain. The natural language search query is then interpreted based on the importance or relevance of each term.

20 Claims, 7 Drawing Sheets

(56) References Cited

U.S. PATENT DOCUMENTS

| | | |
|---|---|---|
| 2010/0306144 A1 | 12/2010 | Scholz et al. |
| 2011/0161341 A1* | 6/2011 | Johnston ............ G06F 16/90332 |
| | | 707/766 |
| 2011/0213761 A1 | 9/2011 | Song et al. |
| 2012/0035932 A1 | 2/2012 | Jitkoff et al. |
| 2012/0084312 A1 | 4/2012 | Jenson |
| 2012/0136649 A1 | 5/2012 | Freising et al. |
| 2013/0021346 A1* | 1/2013 | Terman ................... G09B 5/08 |
| | | 345/467 |
| 2013/0262361 A1 | 10/2013 | Arroyo et al. |
| 2014/0280081 A1 | 9/2014 | Tropin et al. |
| 2015/0026176 A1 | 1/2015 | Bullock |
| 2015/0120723 A1 | 4/2015 | Deshmukh et al. |
| 2015/0269176 A1* | 9/2015 | Marantz ............ G06F 16/90324 |
| | | 707/767 |
| 2015/0287096 A1* | 10/2015 | Jacobsson .......... G06Q 30/0275 |
| | | 705/14.71 |
| 2016/0034600 A1* | 2/2016 | Joshi ................. G06F 16/90335 |
| | | 707/769 |
| 2016/0147872 A1 | 5/2016 | Agarwalla et al. |
| 2016/0147893 A1* | 5/2016 | Mashiach ............... G06Q 50/01 |
| | | 707/710 |
| 2016/0180438 A1* | 6/2016 | Boston ............... G06Q 30/0282 |
| | | 705/26.7 |
| 2016/0275178 A1 | 9/2016 | Liu |
| 2017/0017724 A1 | 1/2017 | MacGillivray et al. |
| 2017/0075985 A1 | 3/2017 | Chakraborty et al. |
| 2017/0097967 A1* | 4/2017 | Savliwala .............. G06Q 30/02 |
| 2017/0116260 A1* | 4/2017 | Chattopadhyay ..... G06F 16/243 |
| 2017/0199928 A1 | 7/2017 | Zhao et al. |
| 2017/0228372 A1 | 8/2017 | Moreno et al. |
| 2017/0278514 A1* | 9/2017 | Mathias .................. G10L 15/22 |
| 2017/0344622 A1 | 11/2017 | Islam et al. |
| 2019/0005953 A1* | 1/2019 | Bundalo ................. G10L 15/22 |
| 2019/0102482 A1* | 4/2019 | Ni ......................... G06F 40/216 |
| 2019/0163781 A1* | 5/2019 | Ackermann ........ G06F 16/9535 |
| 2020/0210891 A1 | 7/2020 | Safronov et al. |
| 2021/0019309 A1 | 1/2021 | Yadav et al. |
| 2021/0026906 A1 | 1/2021 | Reznik |
| 2021/0056114 A1 | 2/2021 | Price et al. |
| 2021/0173836 A1 | 6/2021 | Robert Jose et al. |
| 2021/0232613 A1 | 7/2021 | Raval Contractor et al. |
| 2021/0279264 A1 | 9/2021 | Robert Jose et al. |
| 2021/0280174 A1 | 9/2021 | Robert Jose et al. |
| 2021/0280175 A1 | 9/2021 | Robert Jose et al. |
| 2021/0280176 A1 | 9/2021 | Robert Jose et al. |

\* cited by examiner

SYSTEMS AND METHODS FOR INTERPRETING NATURAL LANGUAGE SEARCH QUERIES

BACKGROUND

This disclosure relates to processing search queries and, more particularly, interpreting natural language search queries.

SUMMARY

With the spread of smart devices, users are more frequently entering search queries using natural language. Such queries are often difficult to decipher and can lead to an unsatisfactory final result for the user. Typically, natural language search queries are normally processed by simply applying a filter, such as content type, to the query, and returning any results that match the query within that filter. However, many natural language search queries include words that are contextually relevant to the search query but are ignored or not given appropriate weight by the processing system because they are not associated with any keyword or genre by themselves. Further, the terms adjacent to each other may not be given proper weight, as each term may be grouped into a search domain, for example, a keyword, content type, genre, and a search for that term may only be done within that domain. Thus, the results of the search do not provide content for which the user was searching and require additional searching.

Systems and methods are described herein for interpreting natural language search queries that account for contextual relevance of words of the search query that would ordinarily not be processed, including, for example, by processing each word of the query. A natural language search query is received, either as a voice input, a text input, or a transcribed voice-to-text input, and a plurality of terms in the natural language search query are identified. Each term is associated with a respective term type, for example, a keyword, a genre, or a content type. Further, the system determines in the natural language search query a term type for each term or phrase. In some embodiments, the query may include a phrase, or a number of phrases that are two or more consecutive set of phrases that may occur at any point in the query. For example, the term or phrase may be at the beginning, at the middle or at the end of the query. For each term or phrase, a term type may be determined and a search performed within the domain of the term type. For example, if the term type is determined to be a genre, the search is performed within the genre domain. In some embodiments, adjacent terms may be determined to be different term types, for example, the natural language search query having a first term or phrase that is a keyword, and a second term or phrase that is a genre. In such an example, where the term types adjacent to each other are different term types, a typical system will search for each term within its term types which may lead to limited results. On the other hand, the system may search for each respective term or phrase to determine if the terms or phrases should be merged or combined with another term based on the term type to improve the search result. The system performs a search in the public domain for the search terms or phrases to determine if they occur in tandem. The system determines a frequency of occurrence of each term in content metadata and based on the frequency, may update the metadata of each term with the new term type. Further, the system may determine a relational score of the first term to the second term based on a frequency of occurrence for the first term and the second term in the public domain. In response to the determined relational score for the first phrase and the second phrase, updating the first term or phrase and the second term or phrase, in the context of the first term type. The natural language search query is then interpreted based on the relevance of each term, for example, a relation of the first term to the second term from the public domain. Search results are retrieved based on the interpreted search query, and the results are then generated for display.

For example, a search query for "I would like to watch a democratic drama movie" may be received, and the user may intend to search for movies that include a "democratic drama," or in which a democratic drama is a major plot point. At the same time, the word "movie" may indicate the desired type of content, for example, tv series, short clip, and movies. The word "drama" may normally be identified as a genre indicating genre type, for example, drama, comedy, romantic comedy, thriller, fiction. The word "democratic" may be identified as a keyword and may be associated with any actor or other identifying information that could narrow a search for keywords to those that are about democratic movies or have democratic as a major plot point. However, the system processes the word "democratic" as a keyword and the word "drama" as a genre and performs a search for the terms based on each term type. For example, the system searches for the keyword "democratic" among a listing of keywords and searches for the genre "drama" among a listing of genres. Based on this data, the word "democratic" is marked as a keyword, the word "drama" is marked as a genre. The search query is interpreted as a query for genres as drama and movies whose metadata contain the word "democratic" such as in a plot summary. Other examples may include searches for "civil war documentary movies." These searches identify the primary type of content ("movies") but the remaining words do not match up with any preexisting content identifiers that would allow for a meaningful search—identifying terms such as "civil war" as uncommon search terms result in a determination that the term is relevant to the search query.

The natural language interpreter may also be trained using a training data set compiled from previous natural language searches that have been annotated. A frequency of occurrence for each term in the training data set is determined in relation to the entire training data set. A relational data structure is generated that associates each term in the training data with its respective frequency. Any term that has a frequency below a threshold frequency is then added to a list of relevant words. When a natural language search query is received, a plurality of terms in the natural language search query are identified and compared with the list of relevant words. If any term of the natural language search query is included in the relevant words list, that term is identified as a keyword. The natural language search query is then interpreted based on any identified keywords. As above, search results are retrieved based on the interpreted search query and generated for display to the user.

For example, the training data may include a total of ten thousand words, and the threshold frequency may be one percent. Thus, if words appear in the training data less than one hundred times, then that words are added to the relevant words list. Using the above example, the relevance of the word "democratic" and "drama" can be determined by checking if the word "democratic" and "drama" appear on the relevant words list. If the word "democratic" and "drama" appears on the relevant words list, then it is identified as a keyword, and the natural language search query is interpreted as a query for movies whose metadata contain the words "democratic" and "drama," such as in a plot summary.

In another example, the training data may include a total of ten thousand phrases, a combination of two or more words, and the threshold frequency may be one percent. Thus, if a phrase appears in the training data less than one hundred times, then that phrase is added to the relevant phrase list. Using the above example, the relevance of the word "democratic drama" can be determined by checking if the phrase "democratic drama" appears on the relevant phrase list. If the word "democratic drama" appears on the relevant words list, then it is identified as a keyword, and the natural language search query is interpreted as a query for movies whose metadata contain the words "democratic drama," such as in a plot summary.

Further, a search of the public domain may be performed for a phrase, a combination of two or more words, and the threshold of occurrence frequency may be a certain value. Thus, if a phrase appears in the public domain more than 10 times or another predetermined occurrence value, then that phrase is added to the relevant phrase list. Using the above example, the relevance of the phrase "democratic drama" can be determined by checking if the phrase "democratic drama" in the public domain, for example, in different news sources, publications, or any combination of searchable metadata accessible from a search. If the phrase "democratic drama" appears in the public domain more frequently than the predetermined value, then it is identified as a keyword, and the natural language search query is interpreted as a query for movies whose metadata contain the words "democratic drama," such as in a plot summary.

The natural language search query can also be interpreted through the use of machine learning, such as using one or more neural networks. After identifying a number of terms in the natural language search query, a vector is generated for each term describing a relationship between each term and a plurality of other terms. Each vector is then inputted into a trained neural network that generates an output based on the input vectors. The natural language search query is then interpreted based on the output of the neural network. For example, for the query "democratic drama movies," a vector for "democratic" may be generated that represents degrees of connection between democratic and other terms in the natural language search query. A vector for "democratic" may be generated that represents degrees of connection between "democratic" and other terms, such as "political" and "election." In some examples, a vector for "democratic drama" may be generated that represents degrees of connection between democratic drama and other terms. A vector for "democratic drama" may be generated that represents degrees of connection between "democratic drama" and other terms, such as "democratic theater," "political theater," and "democratic theater." These vectors may be input into a neural network that processes each input vector and outputs an interpretation of the search query. For example, the vector for democratic drama may return the House of Cards series as a democratic drama and may indicate a connection with a democratic theater, where a Hamilton the musical movie, both House of Cards and Hamilton, have a connection to "democratic drama." The neural network may then output an interpretation of the search query that focuses on the series "House of Cards" and the movie "Hamilton." Identifying terms such as "democratic" and "drama" as uncommon search terms results in a determination that the term is relevant to the search query, and a vector connecting these terms to a particular content type, for example, a movie, would result in an interpretation that accounts for the relevance of the term. Search results are then retrieved based on the interpreted search query and generated for display to the user.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Methods and systems are disclosed herein for interpreting natural language search queries that account for contextual relevance of words of the search query that would ordinarily not be processed, including, for example, processing each word or phrase of the query. As referred to herein, a query is any input from the user and may be a voice query, a text query or a query comprising any other input form. A query may comprise a command, by which the user expects the computing device to perform a certain action (such as "play a movie"). A query may comprise a question, to which the user expects the computing device to provide an answer (such as "What is the tallest building in New York?"). The disclosed methods and systems may be implemented on a computing device. As referred to herein, the computing device can be any device comprising a processor and memory, for example, a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

Figure 1:
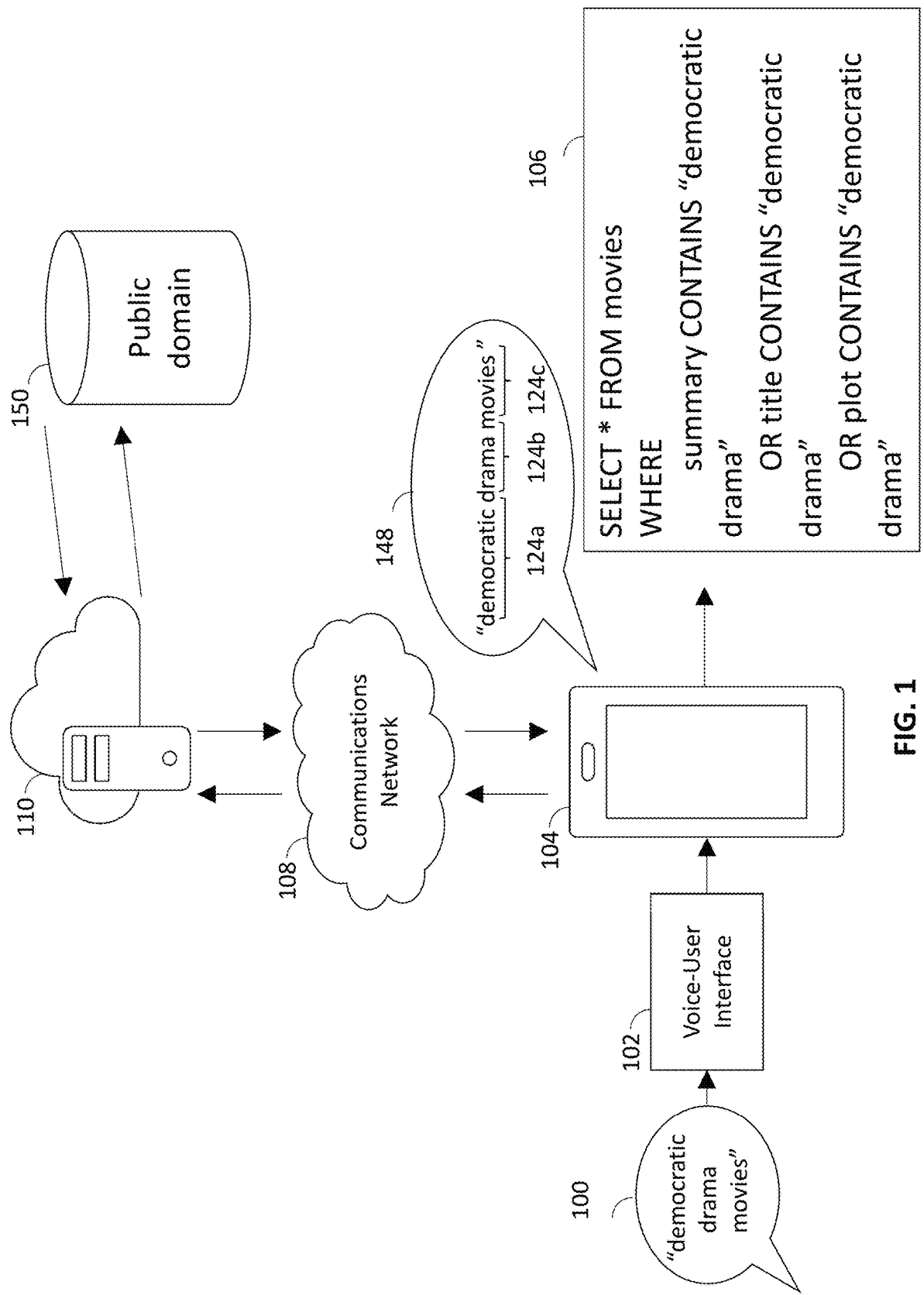
FIG. 1 shows a system for interpreting a natural language search query, in accordance with some embodiments of the disclosure.

FIG. 1 shows a first system for interpreting a natural language search query, in accordance with some embodiments of the disclosure. Natural language search query 100 may be received from a user or from an input device. Voice-user interface 102 may capture spoken words representing the natural language search uttered by the user and transmit a digital representation of the spoken natural language search query to a user device 104. User device 104 processes the words of the natural language search query and transmits the search to the server 110 for interpretation. The user device splits natural language search query 100 into multiple word phrase 148, based on grammatical structure, into a plurality of terms 124a-124c using natural language processing. User device 102 associates each term with a type of term. Term 124a ("democratic") is identified as a keyword; term 124b ("drama") is identified as a filter trigger, in this case a genre, indicating that at least one term that follows the filter trigger should be applied as a filter to the query; and term 124c ("movies") is identified as a content type. Based on these term types, user device 102 generates and performs a search to determine if the terms as designated by the term types provide the best result. User device 104 may transmit the phrase query 148, via a communications network 108, to server 110, which performs a search based on the phrase in the public domain and send the results back to user device 104. The device determines if the terms as they were entered into the query may be interpreted using different term types. The system determines that two consecutive sets of terms or phrases may happen anywhere in the query. The system may combine the phrases or terms to perform a search in the public domain. The system performs a search for the combined phrase, including a first-term or phrase and a second term or phrase in the public domain 150, for example, news, science, history, or any other suitable content. Even though the term drama is designated as a genre, the system performs a search of "democratic drama" as keywords to determine if the terms are used in any public domain as such. The number of occurrences of such a phrase with the first term or phrase and second term or phrase is determined. Based on the number of occurrences exceeding a threshold of the number of occurrences, the phrase is interpreted as keywords. As a result, a relevance value is determined for the first and second term.

User device 104 may also request or retrieve metadata describing content items from server 110 and use it to determine the relevance of each word or term of the natural language search query. Interpretation 106 of the natural language search query may be based on the relevance of each word or term to the subsequent word or term. For example, natural language search query 100 may be the words "democratic drama movies." User device 104 determines, based on the metadata, that the words "democratic" and "drama" are determined as keyword and genre, respectively, and are infrequent words, and must therefore be relevant to the query. User device 104 also determines that the word "movies" is a content type for which a search should be performed. Based on this information, user device 104 interprets the natural language search query and generates a corresponding query in a format that can be understood by server 110, such as an SQL "SELECT" command. The command shown in interpretation 106 is an SQL command to select all records from a "movies" table of a content database where any of a summary, a title, a plot synopsis or metadata contains the words "democratic drama." Various examples of interpreting natural language search queries are described in U.S. patent application Ser. Nos. 16/807,415, 16/807,419, 16/807,421, and 16/807,422 filed on Mar. 3, 2020, which are hereby incorporated by reference herein in their entirety.

Figure 2:
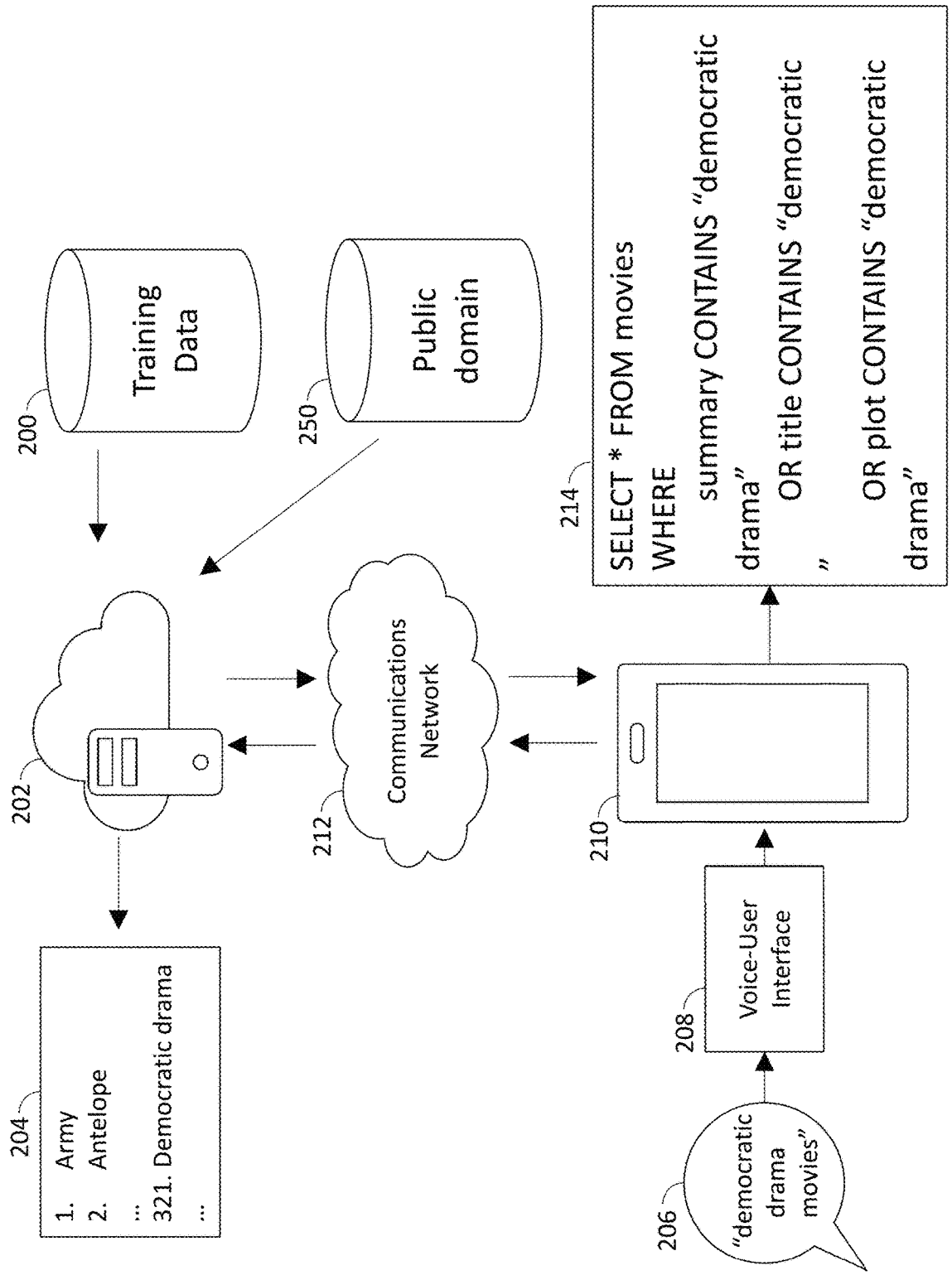
FIG. 2 shows a system for interpreting a natural language search query, in accordance with some embodiments of the disclosure.

FIG. 2 shows a second system for interpreting a natural language search query, in accordance with some embodiments of the disclosure. In some embodiments, a training data set 200 may be provided to or accessed by, server 202. Server 202 may use the training data set to determine a list of relevant words or phrases 204. A natural language search query 206 is received, via voice-user interface 208, at user device 210. User device 210 may request or retrieve, via communications network 212, relevant words list 204 from server 202. User device 210 may compare each word or term or phrase of the natural language search query 206 to relevant words list 204 to determine relevant words or terms of the natural language search query 206. The relevant words of the natural language search query 206 are identified as keywords, and user device 210 interprets natural language search query 206 based on the identified keywords. For example, natural language search query 206 may be the words "democratic drama movies." Based on the training data 200, server 202 determines that "democratic" and "drama" are infrequent words and add them to the relevant words list 204. The user device may combine a multiple word query if it determines that such a combination is widely used in the public domain. For example, the user device 210 may perform a search for a natural language search query 206 that includes two terms as keywords and determine that such terms should be combined to provide desired results. In another example, user device 210 compares the words "democratic" and "drama" to the relevant words list 204 received from server 202 and finds that the word "democratic" and "drama" are included therein. The terms may be included as a single word or term result or may be a combination as a phrase. Based on this, user device 210 identifies "democratic" and "drama" as a keyword. As above, user device 210 identifies the word "movies" as a content type for which a query should be performed and generates interpretation 214, which may be an SQL command as described above.

Figure 3:
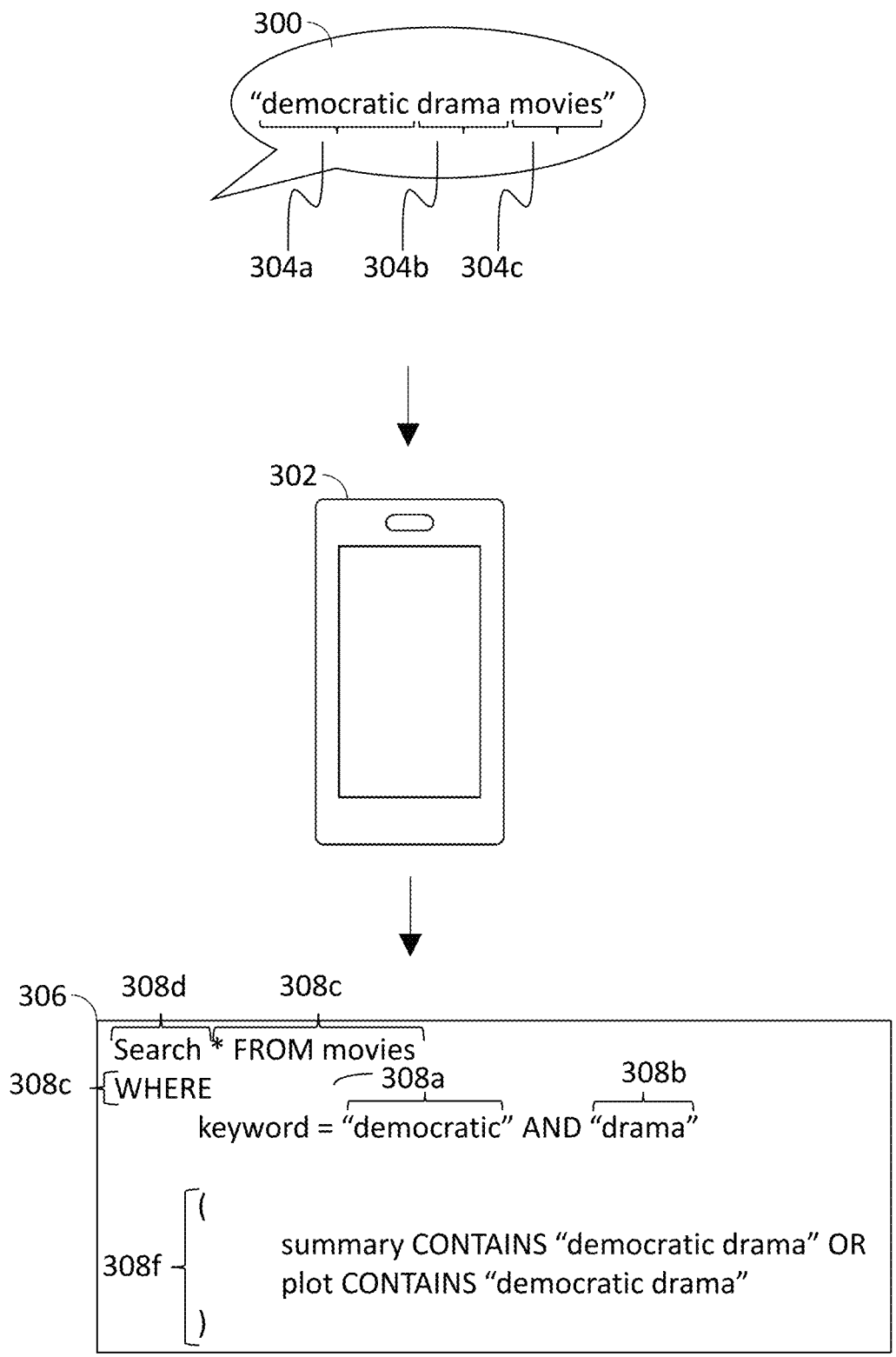
FIG. 3 shows a system for interpreting a natural language search query, in accordance with some embodiments of the disclosure.

FIG. 3 shows a third system for interpreting a natural language search query, in accordance with some embodiments of the disclosure. Natural language search query 300 is received by user device 302. For example, natural language search query 300 may be the phrase "democratic drama movie." The user device splits natural language search query 300 into a plurality of terms 304a-304c using natural language processing. User device 302 associates each term with a type of term. Term 304a ("democratic") is identified as a keyword; term 304b ("drama") is identified as a filter trigger, in this case a genre, indicating that at least one term that follows the filter trigger should be applied as a filter to the query; and term 304c ("movies") is identified as a content type. Based on these associations, user device 302 generates interpretation 306, such as an SQL command, in which terms 304a-304c are included as corresponding portions 308a-308c of the SQL command. Portion 308d, which initializes a search query, corresponds to the action of searching for the terms; portion 308e, which identifies what records to select and from which table the records should be selected, corresponds to term 304c; portion 308a, which initializes a first keyword, corresponds to term 304a; portion 308b, which represents a second keyword, corresponds to second term 304b; and portion 308f represents the search parameters performed on the content metadata.

Figure 4:
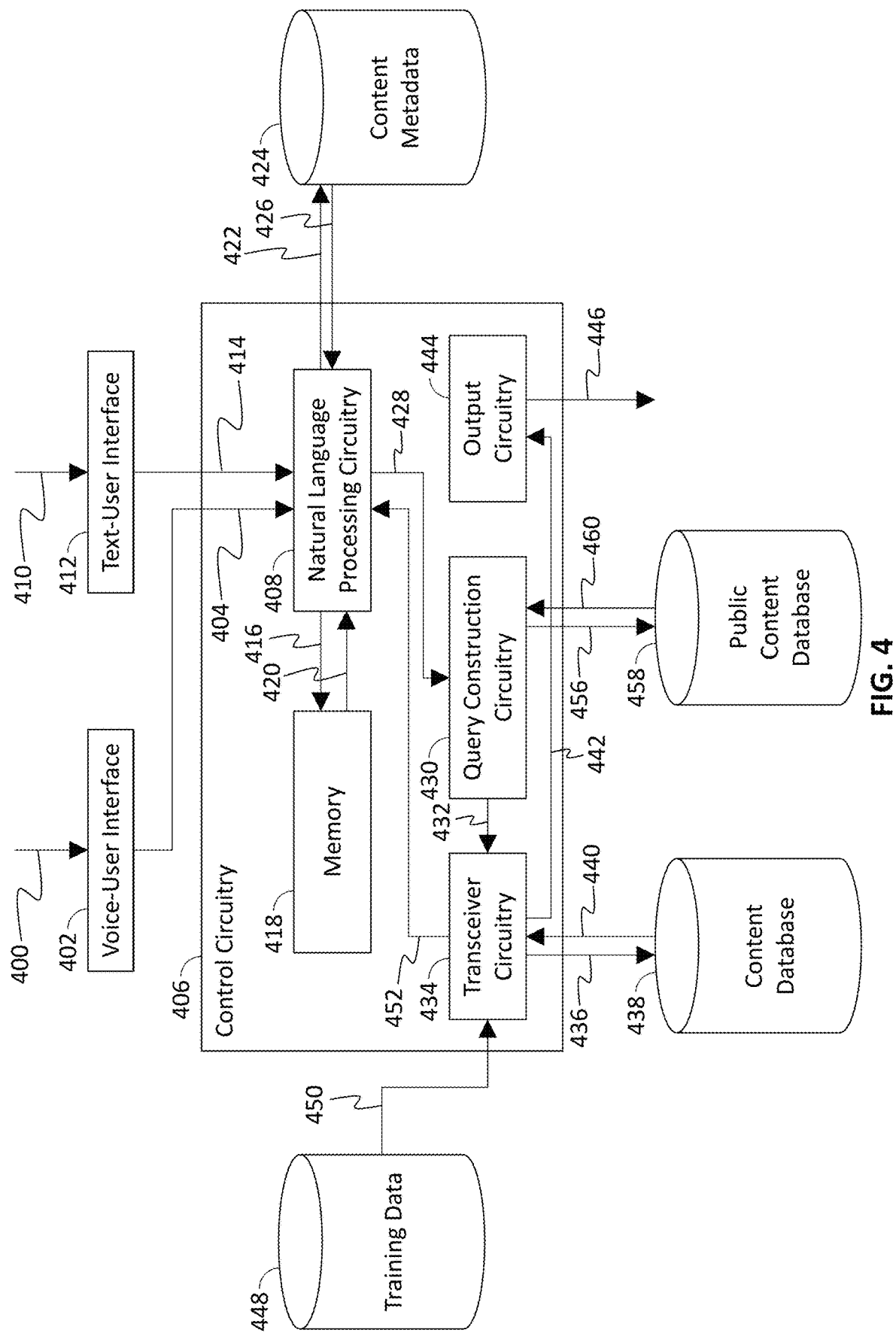
FIG. 4 is a block diagram showing components and data flow therebetween of a device for interpreting a natural language search query, in accordance with some embodiments of the disclosure.

FIG. 4 is a block diagram representing components of a computing device and data flow therebetween of a device for interpreting a natural language search query, in accordance with some embodiments of the disclosure. A natural language search query may be received as voice input 400 using voice-user interface 402. Voice-user interface 402 may include a microphone or other audio capture device capable of capturing raw audio data and may convert raw audio data into a digital representation of voice input 400. Voice-user interface 402 may also include a data interface, such as a network connection using ethernet or WiFi, a Bluetooth connection, or any other suitable data interface for receiving digital audio from another input device. Voice-user interface 402 transmits 404 the digital representation of the voice input to control circuitry 406, where it is received using natural language processing circuitry 408. Natural language processing circuitry may transcribe the audio representing the natural language search query to generate a corresponding text string or may process the audio data directly. Alternatively, a natural language search query may be received as text input 410 using text-user interface 412, which may include similar data interfaces to those described above in connection with voice-user interface 402. Text-user interface 412 transmits 414 the text input 410 to control circuitry 406, where it is received using natural language processing circuitry 408.

Control circuitry 406 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Natural language processing circuitry 408 identifies a plurality of terms in the natural language search query. For example, natural language processing circuitry 408 may identify individual words in the natural language search query using spaces in text input 410 or pauses or periods of silence in voice input 400. Natural language processing circuitry 408 analyzes a first word and determines whether the first word can be part of a larger phrase. For example, natural language processing circuitry 408 may request 416 a dictionary or other word list or phrase list from memory 418. Memory 418 may be any device for temporarily storing electronic data, such as random-access memory, hard drive, solid-state devices quantum storage device, or any other suitable fixed or removable storage device, and/or any combination of the same.

Upon receiving 420 the dictionary or word list or phrase list from memory 418, natural language processing circuitry 408 determines if the first word can be followed by at least a second word. If so, natural language processing circuitry 408 analyzes the first word together with the word immediately following the first word to determine if the two words together form a phrase. If so, the phrase is identified as a single term in the natural language search query. Otherwise, the first word alone is identified as a single term in the natural language search query.

Once the terms of the natural language search query have been identified, natural language processing circuitry 408 associates each term with a type of term. Natural language processing circuitry 408 also determines a frequency with which each term occurs. For example, natural language processing circuitry 408 may request 422 metadata describing a plurality of content items from content metadata 424. Natural language processing circuitry 408 receives 426 the requested metadata and determines how many occurrences of each term there are in the metadata as a percentage of the total number of terms in the metadata. Using the part of speech and frequency of each term, natural language processing circuitry 408 determines a relevance for each term and interprets the natural language search query based on the relevance of each term.

Natural language processing circuitry 408 transmits 428 the interpretation of the natural language search query to query construction circuitry 430, which constructs a search query corresponding to the natural language search query in a format that can be understood by, for example, a content database. Query construction circuitry 430 transmits 456 a search for the format of the natural language search query to the public content domain database 458 to determine the relevance of the natural language search query. The query construction circuitry 430 transmits the query to determine if the first term and the second term are commonly used in the public domain to constitute updating the format of the query to a specific term type shared between the first term and the second term. The public content database 458 transmits 460 to the query construction circuitry 430, the result of the search for the occurrence of the terms or words in the natural language search query. Query construction circuitry 430 transmits 432 the constructed search query to transceiver circuitry 434, which transmits 436 the search query to, for example, content database 438. Transceiver circuitry 434 may be a network connection such as an Ethernet port, WiFi module, or any other data connection suitable for communicating with a remote server. Transceiver circuitry 434 then receives 440 search results from the content database 438 and transmits 442 the search results to output circuitry 444. Output circuitry 444 then generates for display 446 the search results. Output circuitry 444 may be any suitable display driver or other graphic or video signal processing circuitry.

In some embodiments, a training data set is used to determine the relevance of each term. Training data 448 may be processing by control circuitry 406 or by a remote server to determine the relevance of a plurality of terms included in the training data. The resulting list of relevant terms is transmitted 450 to control circuitry 406, where it is received using transceiver circuitry 434. Transceiver circuitry 434 transmits 452 the received list of relevant terms to natural language processing circuitry 408 for use in determining the relevance of each term in the natural language search query.

Figure 5:
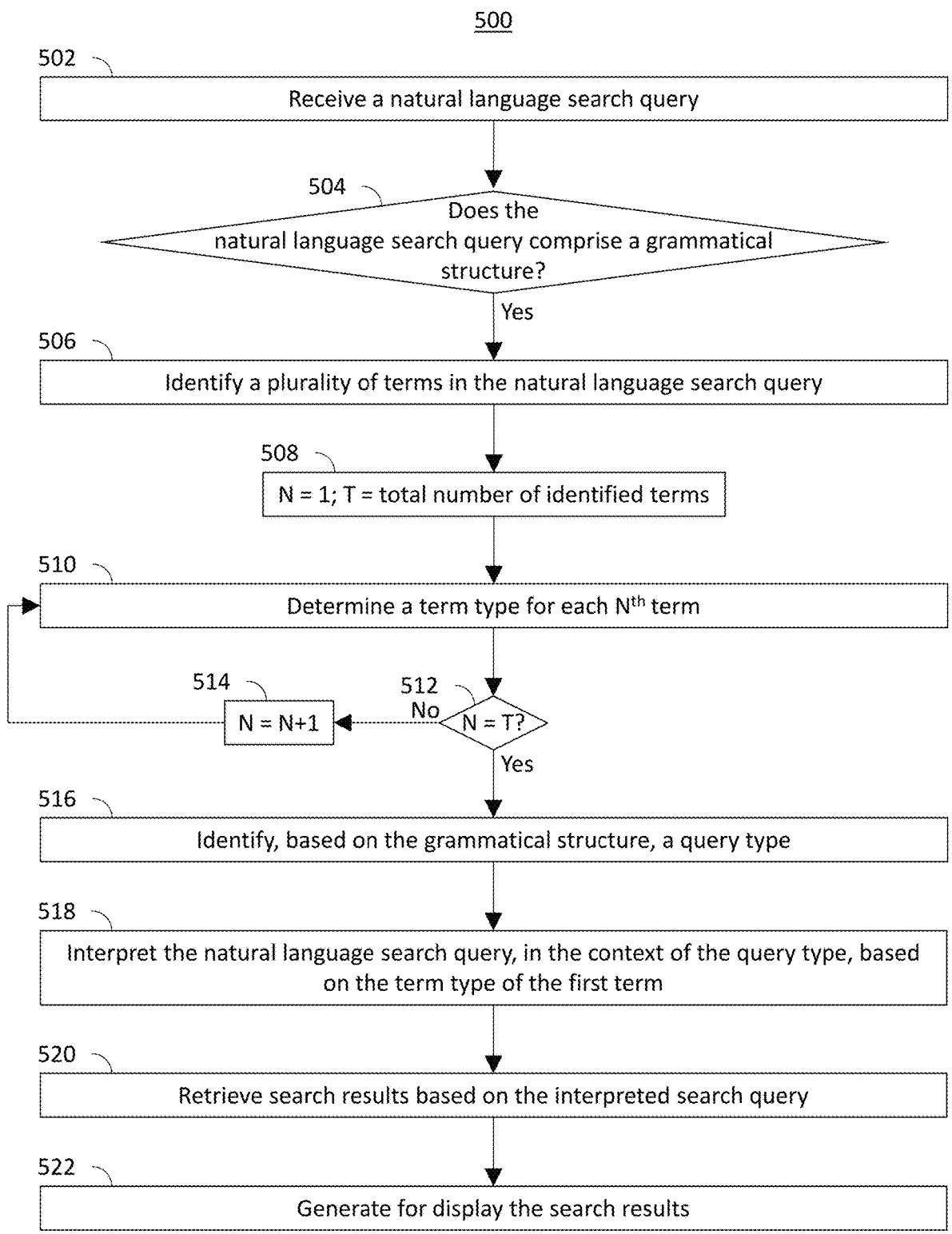
FIG. 5 is a flowchart representing a process for interpreting a natural language search query, in accordance with some embodiments of the disclosure.

FIG. 5 is a flowchart representing a third illustrative process 500 interpreting a natural language search query, in accordance with some embodiments of the disclosure. Process 500 may be implemented on control circuitry 406. In addition, one or more actions of FIG. 5 may be incorporated into or combined with one or more actions of any other process or embodiment described herein.

At 502, control circuitry (e.g., control circuitry 406) receives a natural language search query. At 504, control circuitry 406, using natural language processing circuitry 408, determines whether the natural language search query comprises a complete sentence. For example, natural language processing circuitry 408 may use Hidden Markov Model or Conditional Random Field algorithms or a grammar engine to determine the structure of the natural language search query. If the natural language search query does comprise a complete sentence ("Yes" at 504), then, at 506, control circuitry 406 identifies a plurality of terms in the natural language search query. This may be accomplished using methods described below in connection with FIG. 7.

At 508, control circuitry 406 initializes a counter variable N, setting its value to one, and a variable T representing the total number of identified terms. At 510, control circuitry 406, using natural language processing circuitry 408, associates the $N^{th}$ term with a part of speech. This may be accomplished using methods described below in connection with FIG. 7. At 512, control circuitry 406 determines whether N is equal to T, meaning that all terms of the natural language search query have been associated with a type of term. If N is not equal to T ("No" at 512), then, at 514, control circuitry 406 increments the value of N by one, and processing returns to step 510. If N is equal to T ("Yes" at 512), then, at 516, control circuitry 406 identifies, based on the sentence structure of the natural language search query, a query type. For example, if the natural language search query begins with two terms that are designated as keywords, the query type will be a query for content items matching filter parameters contained in the two terms as keywords. At 518, control circuitry 406 interprets the natural language search query, in the context of the query type, based on the type of term of each of the identified terms.

At 520, control circuitry 406 retrieves search results (e.g., from content database 438) based on the interpreted search query. At 522, control circuitry 406, using output circuitry 444, generates the search results for display to the user.

Figure 6:
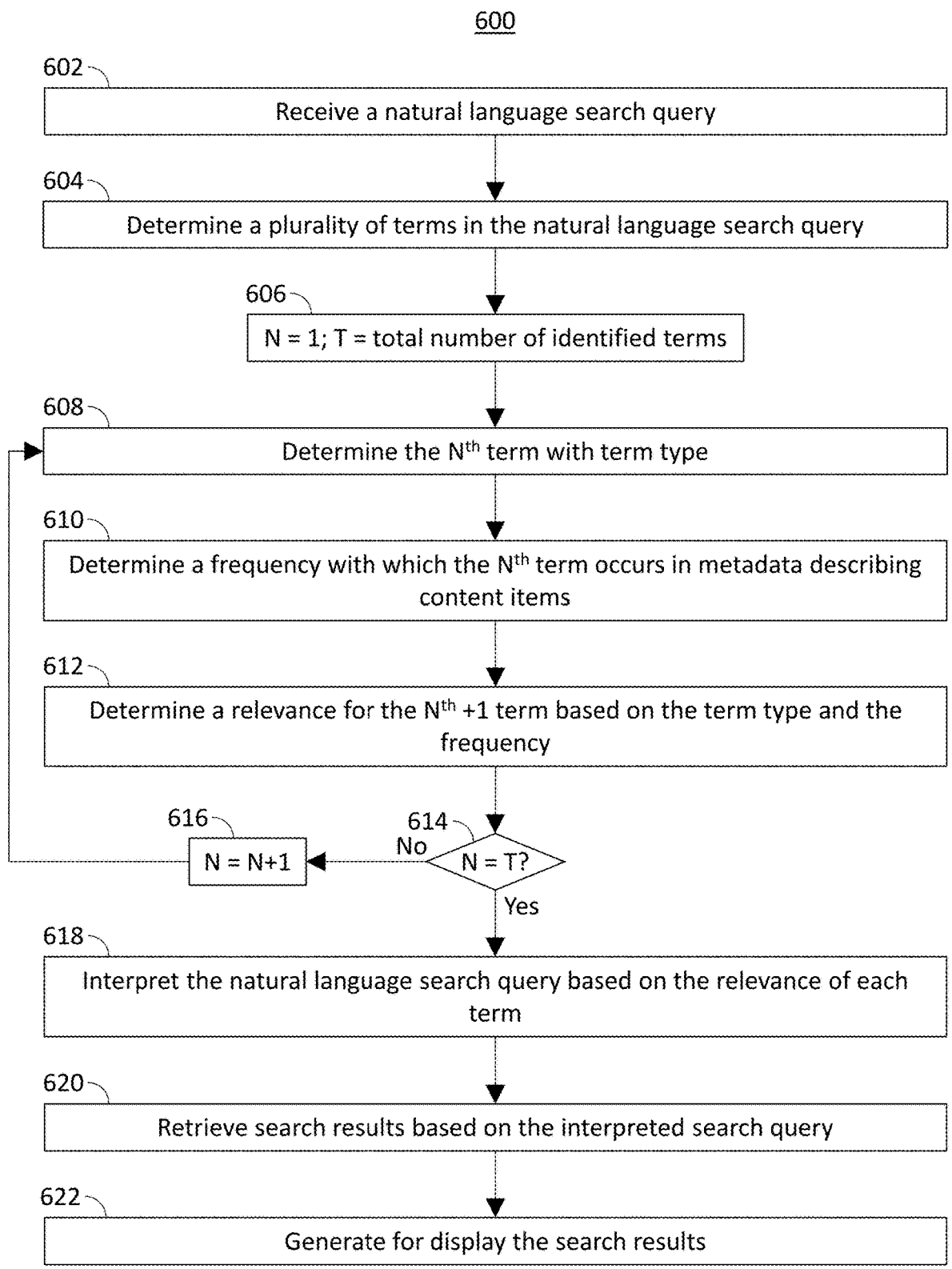
FIG. 6 is a flowchart representing a process for interpreting a natural language search query, in accordance with some embodiments of the disclosure.

The actions or descriptions of FIG. 6 may be used with any other embodiment of this disclosure. In addition, the actions and descriptions described in relation to FIG. 6 may be done in suitable alternative orders or in parallel to further the purposes of this disclosure.

FIG. 6 is a flowchart representing a first illustrative process 600 for interpreting a natural language search query, in accordance with some embodiments of the disclosure. Process 600 may be implemented on control circuitry 406. In addition, one or more actions of FIG. 6 may be incorporated into or combined with one or more actions of any other process or embodiment described herein.

At 602, control circuitry (e.g., control circuitry 406) receives a natural language search query. At 604, control circuitry 406, using natural language processing circuitry 408, identifies a plurality of terms in the natural language search query. This may be accomplished using methods described below in connection with FIG. 7.

At 606, control circuitry 406 initializes a counter variable N, setting its value to one, and a variable T representing the total number of identified terms. At 608, control circuitry 406, using natural language circuitry 408, associates the $N^{th}$ term of the natural language search query with a part of speech. For example, natural language processing circuitry 408 may access a dictionary or other word list or phrase list to identify a part of speech to which the $N^{th}$ term corresponds. At 610, control circuitry 406, using natural language processing circuitry 408, determines a frequency with which the $N^{th}$ term occurs in metadata describing content items. This may be accomplished using methods described above in connection with FIG. 5. At 612, natural language processing circuitry 408 determines a relevance for the $N^{th}$ term based on the part of speech and the frequency of the $N^{th}$ term.

At 614, control circuitry 406 determines whether N is equal to T, meaning that all terms of the natural language search query have been processed to determine their respective relevance. If N is not equal to T ("No" at 614), then, at 616, control circuitry 406 increments the value of N by one, and processing returns to step 608. If N is equal to T ("Yes" at 614), then, at 618, control circuitry 406 interprets the natural language search query based on the relevance of each term.

At 620, control circuitry 406 retrieves search results (e.g., from content database 438) based on the interpreted search query. At 422, control circuitry 406, using output circuitry 444, generates the search results for display to the user.

The actions or descriptions of FIG. 6 may be used with any other embodiment of this disclosure. In addition, the actions and descriptions described in relation to FIG. 6 may be done in suitable alternative orders or in parallel to further the purposes of this disclosure.

Figure 7:
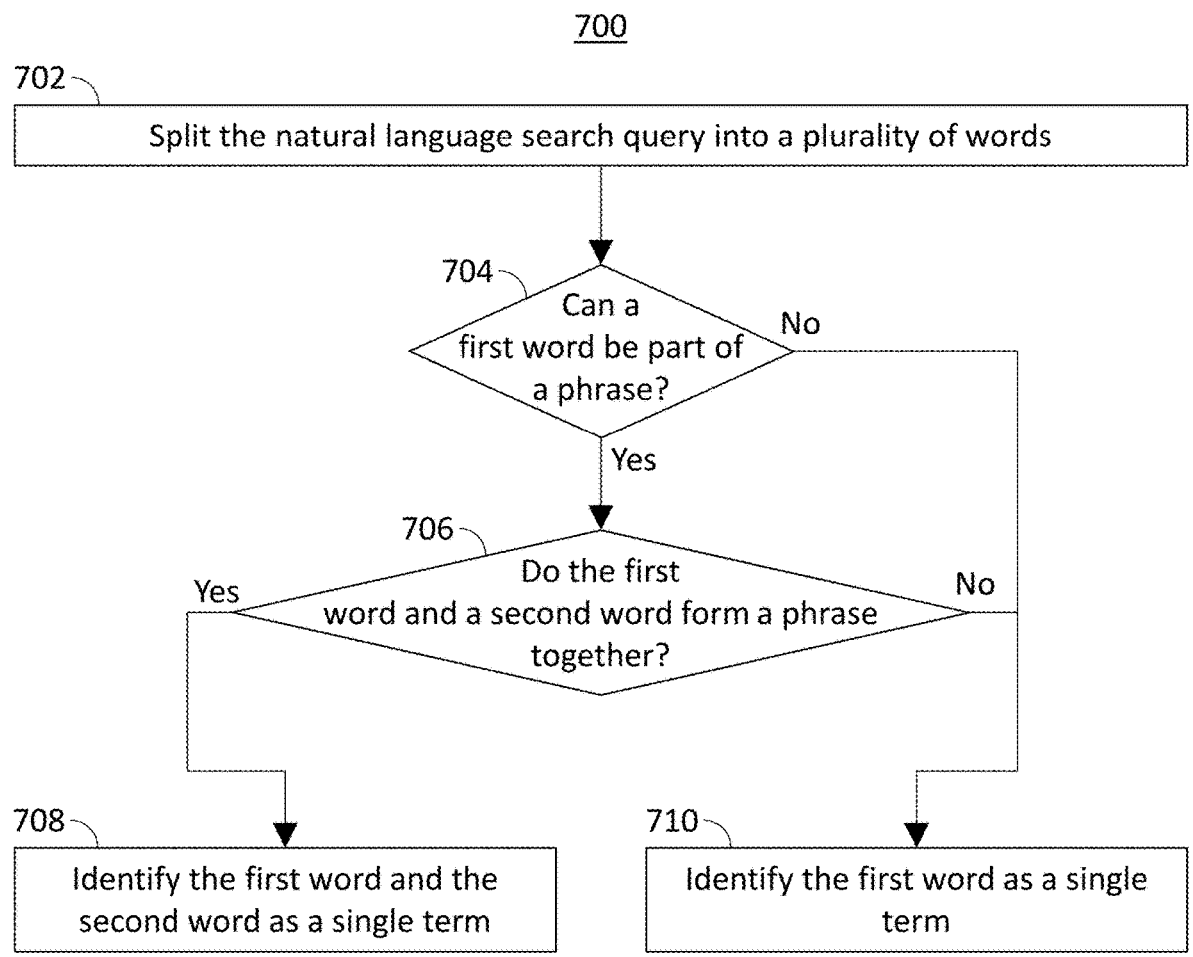
FIG. 7 is a flowchart representing a process for identifying a plurality of terms in a natural language search query, in accordance with some embodiments of the disclosure.

FIG. 7 is a flowchart representing an illustrative process 700 for identifying a plurality of terms in a natural language search query, in accordance with some embodiments of the disclosure. Process 700 may be implemented on control circuitry 406. In addition, one or more actions of FIG. 7 may be incorporated into or combined with one or more actions of any other process or embodiment described herein.

At 702, control circuitry (e.g., control circuitry 406), using natural language processing circuitry 408, splits the natural language search query into a plurality of words. For example, natural language processing circuitry 408 may identify pauses or periods of silence in audio data representing the natural language search query and split the audio data at each period of silence to separate the audio data into audio chunks, each representing a single word. Alternatively, natural language processing circuitry 408 may receive the natural language search query as text or may transcribe audio data into corresponding text. Natural language processing circuitry 408 may then split the text into individual words in every space.

At 704, control circuitry 406, using natural language processing circuitry 408, determines whether a word or phrase that may occur at any part of the natural language search query can be part of a combined phrase. The natural language search query may include a number of phrases and terms and any one word or phrase may be searched independently or combined for a search of a combined search phrase. For example, natural language processing circuitry 408 may access a dictionary, word list, or phrase list, and identify any phrases that begin with each word or phrase in the natural language processing query. If a phrase beginning with a word or phrase is located ("Yes" at 704), then, at 706, natural language processing circuitry 408 determines whether the first word and a second word immediately following the first word form a phrase together. Natural language processing circuitry 408 may concentrate the first and second words to form a string representing a possible phrase formed by the first and second words together and compare the string to the dictionary, word list, or phrase list, as above. If the first and second words form a phrase together ("Yes" at 706), then, at 708, natural language processing circuitry 408 identifies the first and second words together as a single phrase. If the first and second words do not form a phrase together ("No" at 706) or if the first word cannot be part of a phrase at all ("No" at 704), then, at 710, natural language processing circuitry 408 identifies the first word as a single term.

The actions or descriptions of FIG. 7 may be used with any other embodiment of this disclosure. In addition, the actions and descriptions described in relation to FIG. 7 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

What is claimed is:

1. A computer-implemented method for interpreting a natural language search query, the method comprising using processing circuitry for:
   receiving the natural language search query;
   determining, using natural language processing, that the natural language search query comprises a plurality of terms or phrases, each term or phrase of the plurality of terms or phrases is associated with a respective term type;
   determining, based on a grammatical structure, a first term type associated with a first term or phrase of the plurality of terms or phrases and a second term type associated with a second term or phrase of the plurality of terms or phrases, wherein the first term type is different than the second term type;
   performing a first search for the first term or phrase in a public domain and a second search for the second term or phrase in the public domain;
   determining a relation score between the first term or phrase and the second term or phrase based on the first search and the second search;
   based on the determined relation score, interpreting the natural language search query including the first term or phrase and the second term or phrase, in a context of the first term type;
   retrieving search results based on the interpreted natural language search query; and
   generating for display the search results.

2. The method of claim 1, wherein the natural language search query is received from an input device.

3. The method of claim 1, wherein the natural language search query is received as audio data, then the method further comprises transcribing the natural language search query into a plurality of words.

4. The method of claim 1, wherein determining that the natural language search query comprises a plurality of terms or phrases, further comprises:
   splitting the natural language search query into a plurality of words;
   analyzing a first word of the plurality of words;
   determining, based on analyzing the first word, whether the first word can be part of the first term type;
   in response to determining that the first word can be part of the first term type, analyzing the first word together with a second word that immediately follows the first word;
   determining, based on analyzing the first word together with the second word, whether the first word and the second word can be analyzed using the first term type;
   in response to determining that the first word and the second word can be analyzed using the first term type, identifying the first and second word as associated with the first term type.

5. The method of claim 1, further comprises:
   determining a respective frequency with which the second term or phrase immediately follows the first term or phrase of the plurality of terms or phrases in metadata describing a plurality of content items;
   determining a relevance for each term or phrase of the plurality of terms or phrases based on its respective term type and frequency; and
   interpreting the natural language search query based on the relevance of each term or phrase.

6. The method of claim 5, wherein determining the respective frequency with which the second term or phrase immediately follows the first term or phrase of the plurality of terms or phrases in metadata describing a plurality of content items comprises:
   retrieving the metadata describing the plurality of content items; and
   counting the total occurrences of the second term or phrase immediately following the first term or phrase contained in the metadata.

7. The method of claim 1, wherein the term type is selected from a keyword, a genre, and content type.

8. The method of claim 1, further comprises:
   generating a respective vector for each term of the plurality of terms;
   accessing a knowledge graph associated with content metadata;
   identifying a plurality of terms or phrases to which each term or phrase of the plurality of terms or phrases connects in the knowledge graph;
   calculating a distance between each respective term or phrase and each term or phrase connected to the respective term or phrase; and
   generating the vector for each term or phrase based on connections of each respective term or phrase and the distance between each respective term or phrase and each term or phrase to which each respective term or phrase is connected.

9. A system for interpreting a natural language search query, the system comprising control circuitry configured to:
   receive the natural language search query;
   determine, using natural language processing, that the natural language search query comprises a plurality of terms or phrases, each term or phrase of the plurality of terms or phrases is associated with a respective term type;
   determine, based on a grammatical structure, a first term type associated with a first term or phrase of the plurality of terms or phrases and a second term type associated with a second term or phrase of the plurality of terms or phrases, wherein the first term type is different than the second term type;

perform a first search for the first term or phrase in a public domain and a second search for the second term or phrase in the public domain;

determine a relation score between the first term or phrase and the second term or phrase based on the first search and the second search;

based on the determined relation score, interpret the natural language search query including the first term or phrase and the second term or phrase, in a context of the first term type;

retrieve search results based on the interpreted the natural language search query; and generate for display the search results.

10. The system of claim 9, wherein the natural language search query is received from an input device.

11. The system of claim 9, wherein the natural language search query is received as audio data, then the method further comprises transcribing the natural language search query into a plurality of words.

12. The system of claim 9, wherein the control circuitry configured to determine that the natural language search query comprises a plurality of terms, is further configured to:

split the natural language search query into a plurality of words;

analyze a first word of the plurality of words;

determine, based on analyzing the first word, whether the first word can be part of the first term type;

in response to determining that the first word can be part of the first term type, analyze the first word together with a second word that immediately follows the first word;

determine, based on analyzing the first word together with the second word, whether the first word and the second word can be analyzed using the first term type;

in response to determining that the first word and the second word can be analyzed using the first term type, identify the first and second word as associated with the first term type.

13. The system of claim 9, the control circuitry is further configured to:

determine a respective frequency with which the second term or phrase immediately follows the first term or phrase of the plurality of terms or phrases in metadata describing a plurality of content items;

determine a relevance for each term or phrase of the plurality of terms or phrases based on its respective term type and frequency; and interpret the natural language search query based on the relevance of each term or phrase.

14. The system of claim 13, wherein the control circuitry configured to determine the respective frequency with which the second term immediately follows the first term or phrase of the plurality of terms or phrases in metadata describing a plurality of content items is configured to:

retrieve the metadata describing the plurality of content items; and count the total occurrences of the second term or phrase immediately following the first term or phrase contained in the metadata.

15. The system of claim 9, wherein the term type is selected from a keyword, a genre, and content type.

16. The system of claim 9, the control circuitry is further configured to:

generate a respective vector for each term or phrase of the plurality of terms or phrases;

access a knowledge graph associated with content metadata;

identify a plurality of terms or phrases to which each term or phrase of the plurality of terms or phrase connects in the knowledge graph;

calculate a distance between each respective term or phrase and each term or phrase connected to the respective term or phrase; and generate the vector for each term or phrase based on connections of each respective term or phrase and the distance between each respective term or phrase and each term or phrase to which each respective term or phrase is connected.

17. A non-transitory computer-readable medium having non-transitory computer-readable instructions encoded thereon for interpreting a natural language search query that, when executed by control circuitry, cause the control circuitry to:

receive the natural language search query;

determine, using natural language processing, that the natural language search query comprises a plurality of terms or phrases, each term or phrase of the plurality of terms or phrases is associated with a respective term type;

determine, based on a grammatical structure, a first term type associated with a first term or phrase of the plurality of terms or phrases and a second term type associated with a second term or phrase of the plurality of terms or phrase, wherein the first term type is different than the second term type;

perform a first search for the first term or phrase in a public domain and a second search for the second term or phrase in the public domain;

determine a relation score between the first term or phrase and the second term or phrase based on the first search and the second search;

based on the determined relation score, interpret the natural language search query including the first term or phrase and the second term or phrase, in a context of the first term type;

retrieve search results based on the interpreted the natural language search query; and generate for display the search results.

18. The non-transitory computer-readable medium of claim 17, wherein the natural language search query is received from an input device.

19. The non-transitory computer-readable medium of claim 17, wherein the natural language search query is received as audio data, wherein the execution of the instructions further causes the control circuitry to transcribe the natural language search query into a plurality of words.

20. The non-transitory computer-readable medium of claim 17, wherein execution of the instruction to determine that the natural language search query comprises a plurality of terms or phrase, is further configured to:

split the natural language search query into a plurality of words;

analyze a first word of the plurality of words;

determine, based on analyzing the first word, whether the first word can be part of the first term type;

in response to determining that the first word can be part of the first term type, analyze the first word together with a second word that immediately follows the first word;

determine, based on analyzing the first word together with the second word, whether the first word and the second word can be analyzed using the first term type;

in response to determining that the first word and the second word can be analyzed using the first term type, identify the first and second word as associated with the first term type.

\* \* \* \* \*